United States Patent
Igra et al.

(10) Patent No.: US 6,701,485 B1
(45) Date of Patent: Mar. 2, 2004

(54) BINDING SPREADSHEET CELLS TO OBJECTS

(75) Inventors: Mark S. Igra, Seattle, WA (US); Eric L. Matteson, Bellevue, WA (US); Andrew M. P. Milton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/333,756

(22) Filed: Jun. 15, 1999

(51) Int. Cl.[7] ............... G06F 15/00; G06F 17/00
(52) U.S. Cl. ............ 715/503; 715/513; 715/538; 715/901
(58) Field of Search ................ 707/503, 513, 707/538, 901; 715/503, 513, 538, 901

(56) References Cited

U.S. PATENT DOCUMENTS

| | | | | |
|---|---|---|---|---|
| 5,255,363 A | * | 10/1993 | Seyler | 707/526 |
| 5,485,617 A | * | 1/1996 | Stutz et al. | 709/315 |
| 5,581,677 A | * | 12/1996 | Myers et al. | 345/440 |
| 5,708,827 A | * | 1/1998 | Kaneko et al. | 707/503 |
| 5,721,847 A | * | 2/1998 | Johnson | 345/786 |
| 5,768,158 A | * | 6/1998 | Adler et al. | 345/700 |
| 5,883,623 A | * | 3/1999 | Cseri | 345/866 |
| 5,911,066 A | * | 6/1999 | Williams et al. | 709/310 |
| 5,983,268 A | * | 11/1999 | Freivald et al. | 707/513 |
| 6,034,681 A | * | 3/2000 | Miller et al. | 345/748 |
| 6,122,649 A | * | 9/2000 | Kanerva et al. | 707/516 |
| 6,157,934 A | * | 12/2000 | Khan et al. | 345/747 |
| 6,192,379 B1 | * | 2/2001 | Bekenn | 707/503 |
| 6,199,082 B1 | * | 3/2001 | Ferrel et al. | 707/515 |
| 6,256,649 B1 | * | 7/2001 | Mackinlay et al. | 345/473 |
| 6,292,809 B1 | * | 9/2001 | Edelman | 706/45 |
| 6,301,590 B1 | * | 10/2001 | Siow et al. | 707/500 |
| 6,401,099 B1 | * | 6/2002 | Koppolu et al. | 707/103 R |

OTHER PUBLICATIONS

Ewing et al., "Using Quattro Pro 6 for Windows", 1994, Que Corporation, pp. 284–289.*

* cited by examiner

Primary Examiner—Joseph H. Feild
Assistant Examiner—Almari Yuan
(74) Attorney, Agent, or Firm—Ronald M. Anderson

(57) ABSTRACT

Spreadsheet cells are bound to external objects using a direct communication scheme having little processing overhead. A spreadsheet cell is bound to an object external to the spreadsheet, exposing a property or method of the object. The exposed property or method can then be used to update the value of the spreadsheet cell, either automatically when the exposed property changes, or in response to a request from the spreadsheet. The spreadsheet is preferably a spreadsheet COM control, which is embedded in a web page that is preferably browsed with a Microsoft INTERNET EXPLORER™ browser. The external object is also preferably embedded in the web page and may include an automatic control that is used to acquire data over a network such as the Internet.

30 Claims, 4 Drawing Sheets

BINDING SPREADSHEET CELLS TO OBJECTS

FIELD OF THE INVENTION

The invention generally concerns the use of computer spreadsheets, and in particular, relates to binding spreadsheet cells to external objects.

BACKGROUND OF THE INVENTION

During the past decade, computer software has evolved from independent applications running alone, to integrated suites of applications capable of sharing information between applications in the suite. The applications may be running either on the same computer or on different computers connected via a network. In order to share information between different software applications, a communication scheme for transferring the data is required. One such scheme is the Dynamic Data Exchange (DDE) protocol that is used to transfer data between application programs running on Microsoft Corporation's WINDOWS™ operating systems.

DDE is a standard inter-application communication protocol built into Microsoft Corporation's WINDOWS™ operating systems, such as WINDOWS™ 3.x, WINDOWS 95™, WINDOWS 98™, and WINDOWS NT™, (hereinafter collectively or singularly referred to as WINDOWS™ operating systems. This protocol allows WINDOWS™ programs that support DDE to exchange data between themselves. DDE can be thought of as a direct conversation between two application programs. In most cases, one application is providing some form of data (either text or graphics) to another application. The application that is the source of the data is called the "server" and the application that is receiving the data is called the "client."

Each data item that a server application can provide has a unique identifier consisting of three parts: a DDE Application Name; a DDE Topic; and a DDE Item Name. The DDE Application Name is almost always the executable filename for the server application (without the ".exe" extension). The DDE Topic typically identifies a group or category of data in the server application, and each data item that a server can provide has a unique DDE Item Name. Thus, the Application Name, Topic, and Item Name uniquely identify the source of the data in a server application that is to be linked to a client application.

DDE links are always initiated in the client application. The client initiates a DDE link by broadcasting a message containing a DDE Application Name, a DDE Topic, and optionally a DDE Item to all other applications currently running. If a server application is running that can provide the data, it responds to the "DDE initiate" command and the operating system opens a "link" between the two applications. Fortunately, most WINDOWS™ programs that support DDE insulate the user from the low-level details of establishing DDE links and simply allow the user to specify the Application Name, Topic, and Item Name for a specific piece of data and the link is then automatically established by the user's application program.

More recent versions of the WINDOWS™ operating systems support a feature called "Network DDE." Network DDE allows DDE data to be passed across a network from one computer to another, allowing the client and server applications to run on different computers connected across a network. Network DDE must be enabled in Windows by running the program "NETDDE.EXE" before any data can be transferred.

It is often desirable to link or "bind" information in a spreadsheet cell to information contained in an external data source. For example, a spreadsheet that calculates gross revenues for a business may contain cells that are linked to data contained in another application program, such as a database application. For example, DDE can be used to dynamically link a cell in a Microsoft EXCEL™ spreadsheet to a data field in the database application program running on another computer. A user would enter the following formula in the spreadsheet cell and then press the Enter key:

=\\ComputerName\NDDE$|$MyPage.dde!Field     (1).

The formula contains the three parts necessary to successfully link the client application to server the application program, including the Network DDE Application Name, which is referenced by the name of the computer running the DDE Server program, followed by a single slash and the word "NDDE$." The DDE Topic appears after the dollar sign, referenced by the "Page Name" that is assigned in the ClipBook application, followed by a period and the word "dde." Finally, the specific DDE Item Name ('Field(1)') is included.

Upon activation of the Enter key, EXCEL™ will automatically establish a DDE link between the field in the server application program and the spreadsheet cell. (The server application program must be running on a computer coupled to the computer running the client application over a network in order for the above link formula to be successful). After the link is established, any data in the text box "Field(1)" in the server application program will automatically appear in the "linked" cell in the spreadsheet. Also, whenever the data for Field(1) in the server application program changes, the contents of the spreadsheet cell will automatically be updated with the new data. Effectively, the operating system does an automatic cut and paste from the server application to the client application whenever the server application's data changes.

Either application involved in a DDE data link can terminate the link. Some applications have menu options that allow a user to selectively terminate any open DDE links. Closing either of the linked applications also causes all active links between the two programs to be terminated.

The process of setting up a network DDE connection is fairly simple and involves using the "ClipBook" application found in the "Main" program group in the WINDOWS™ operating systems. The ClipBook extends the concept of the WINDOWS™ Clipboard across a network. The ClipBook allows a user to create "ClipBook Pages" that can be "shared" with other computers on a network. Once a user creates and shares a page on one computer, other computers on the network can "connect" to that page. If the page contains data from a DDE server, then the user can set up DDE links to the data, and the data will be passed to any client application on the network just as if the client application were running on the same local computer as the server application.

After a user creates a "Page Name" using the ClipBook application and pastes data from a DDE server into the page, the page name and the DDE connection data contained in it will continue to exist even after the ClipBook application is closed on both computers. The WINDOWS™ operating systems can even shut down on both computers without terminating the link, since upon restarting, the client application will be able to re-establish the DDE link using the same Network DDE Application, Topic, and Item Name.

While DDE and Network DDE are beneficial, they have their limitations. These protocols communicate by passing messages between "windows" (each application in the WINDOWS™ operating systems runs in it own separate "window"). Each application must process the messages it receives through its event loop message processing sequence, which leads to extra overhead and slows down throughput. The server application must also create and send a message to all external clients every time a linked field changes its value. In addition, only WINDOWS™ programs support DDE and Network DDE. Thus, a user cannot establish a link to data contained in a non-WINDOWS™ application program using DDE or Network DDE.

Clearly, it would be desirable to provide a scheme that enables a user to bind spreadsheet cells to various external data sources (objects), while providing faster throughput and less overhead than when using DDE. It would also be advantageous to provide a scheme that enables data from bound objects to be retrieved from computers that use operating systems other than the WINDOWS™ operating systems, and from applications that are written in different languages. In addition, it would be desirable to be able to link spreadsheet cells to the methods exposed by such external objects.

SUMMARY OF THE INVENTION

The present invention addresses the shortcomings of DDE and other prior art by providing a method for binding spreadsheet cells to external objects that incorporates a direct communication scheme with little overhead. The method allows a spreadsheet cell to be bound to an object external to the spreadsheet that exposes a method or property of the object. The exposed property or method can then be used to update the value of the spreadsheet cell, either automatically when the exposed property changes, or upon request from the spreadsheet. The method preferably is implemented through the use of Microsoft Corporation's Component Object Model (COM) architecture. Alternately, the method can be implemented using other object model architectures that are functionally similar to COM, including Sun Corporation's JAVA BEANS™.

According to a first aspect of the invention, a method is provided for binding a spreadsheet cell to a property exposed by an external object. A formula for the cell is created comprising a portion that references a property of an external object. The formula is then parsed to extract the portion of the formula that references the external object and its property. A property change notice is set up between the spreadsheet and the object based on the extracted reference information and is then forwarded to the spreadsheet whenever the object's property changes. When such a change occurs, a value of the changed property is extracted from the object. The formula in the cell is then recalculated based on the changed property value that it references, and other cells that contain a formula that includes a reference to the cell are recalculated. In one preferred embodiment, the spreadsheet is a Microsoft OFFICE 2000™ spreadsheet COM control. Additionally, the spreadsheet COM control and the external object preferably are both contained in a web-page document that is being browsed by a Microsoft Corporation INTERNET EXPLORER™ browser.

According to a second aspect of the invention, a method is provided for binding a spreadsheet cell to a method (function) or property exposed by an external object. A formula that comprises a reference to the object is created, wherein the formula includes an identity of the object and a method or property exposed by the object. The formula is then extracted to identify the object and its exposed method or property. The cell is bound to the object's exposed method or cell by setting up a link to the object so that the object's exposed method is executed or its exposed property is retrieved when a recalculation is performed on the cell by the spreadsheet program. The object is preferably part of a top-level document, and the reference in the formula preferably includes a portion that identifies the top-level document. The top-level document preferably provides an interface that returns an identifier to the object and its exposed method or property, wherein the object's method or property is accessed by using the identifier.

Another aspect of the present invention is directed to a system that includes a memory in which a plurality of machine instructions are stored, and a processor that is coupled to the memory. The processor executes the machine instructions and implements a plurality of functions that are generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

A Brief Overview of COM

Modern computer programming systems are often built around "object-oriented" technology, called models. One of these models is the COM architecture developed by Microsoft Corporation that allows applications to be built using binary software components. This binary standard enables two applications to communicate through object-oriented interfaces without requiring either to know anything about the other's implementation. It is not necessary that the applications run on the same operating system; in fact, the applications can run on any operating system that supports COM, including WINDOWS™ operating systems, APPLE™ operating systems, and variations of UNIX™.

COM is often discussed in the context of Object Linking and Embedding (OLE), a technology developed by Microsoft Corporation that enables an application to perform operations on a special type of object called a "windows object." OLE is an implementation of many of the facets of COM, and COM objects are often called OLE objects and vice-versa. For these and other reasons, the terms COM and OLE are used interchangeably herein.

COM is built around objects and their interfaces. In COM, an object is a piece of compiled code that provides some service to the rest of the system. An object as used in COM is referred to as a COM component, or simply as a component. An interface is defined as "a set of semantically related functions (i.e., methods) implemented on an object." The word "interface" refers to the definition (or prototype or signatures) of those functions. An object's interface(s) allows external users to obtain data from the object and/or make modifications to the object's data, and/or to invoke an object's methods.

Figure 1:
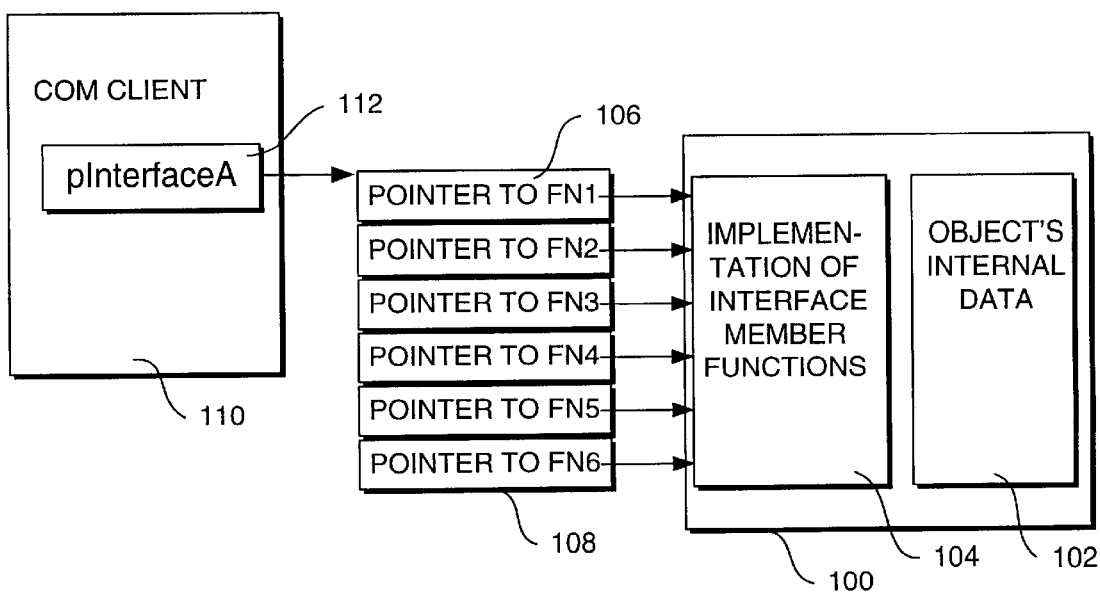
FIG. 1 is a schematic block diagram providing an overview of the relationship between objects and interfaces under the COM object model.
Figure 2:
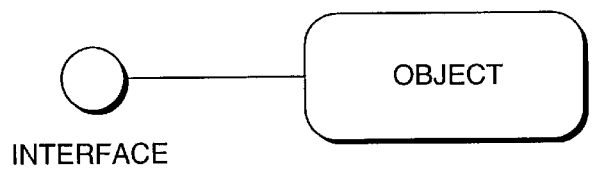
FIG. 2 is a schematic diagram illustrating a COM interface and object.

FIG. 1 illustrates an overview of the relationship between an object 100, its interface, and a COM client (i.e., an object user). Object 100 comprises internal data 102 and a plurality of functions 104 that can be used to perform operations on that data (the object's member functions or methods). These functions can be accessed via a plurality of pointers 106, which comprise a "v-table" 108. The set of functions and their pointers collectively comprise an object's interface. As shown in FIG. 2, the interface can be represented with a circle connected to a line that is extended from the object. A COM client 110, such as a WINDOWS™ application, accesses the object interface via an interface pointer 112.

COM clients cannot directly access component data. A COM client can only access an object's data if the object's interface provides means for doing so. This aspect of a COM client is different than a conventional C++ object, which clients can access directly to obtain data. The COM client might be a written in C, Pascal, Smalltalk, or another language—it makes no difference, because COM is a binary standard, which allows the interface to "hide" the object details from the client.

Conceptually, an interface pointer can be viewed simply as a pointer to a function table (i.e., the v-table) in which a client can call those functions by referencing them with the interface pointer. An instantiation of an interface implementation is simply an array of pointers to functions. Any code that has access to that array, i.e., a pointer through which the top of the array is accessed, can call the functions in that interface, as shown in FIG. 1. In reality, a pointer to an interface is actually a pointer to a pointer that points to one of the functions in the function table. The interface definition allows the code (i.e., the COM client) to call functions by name and provides type checking on parameters instead of calling functions by an index into the array.

Microsoft OFFICE 2000™ Web Components

Microsoft OFFICE 2000™ extends the functionality of conventional spreadsheets by allowing them to be published to a web server. For example, a user can design a spreadsheet workbook in Microsoft EXCEL™, and then convert it (or one of its sheets, or a range of cells in one of its sheets) into an interactive web page by selectively saving the workbook as a web page and selecting the option to publish the page interactively. This feature allows the user to easily include spreadsheet functionality within the web pages being designed.

This spreadsheet functionality and other related functionality is provided by OFFICE 2000's™ Web Components, a collection of COM controls for publishing spreadsheets, charts, and databases to the web, which leverage the rich interactivity provided by Microsoft INTERNET EXPLORER™. The OFFICE™ Web Components include a spreadsheet, a PivotTable, a data source, and a chart. The spreadsheet component provides a recalculation engine, a full function library, and simple spreadsheet user interface functionality for web pages. As discussed below, the formulas in the spreadsheet cells can refer to other cells or to any control on the page or another URL via INTERNET EXPLORER's™ document object model (DOM).

Stock Portfolio Example

Figure 4:
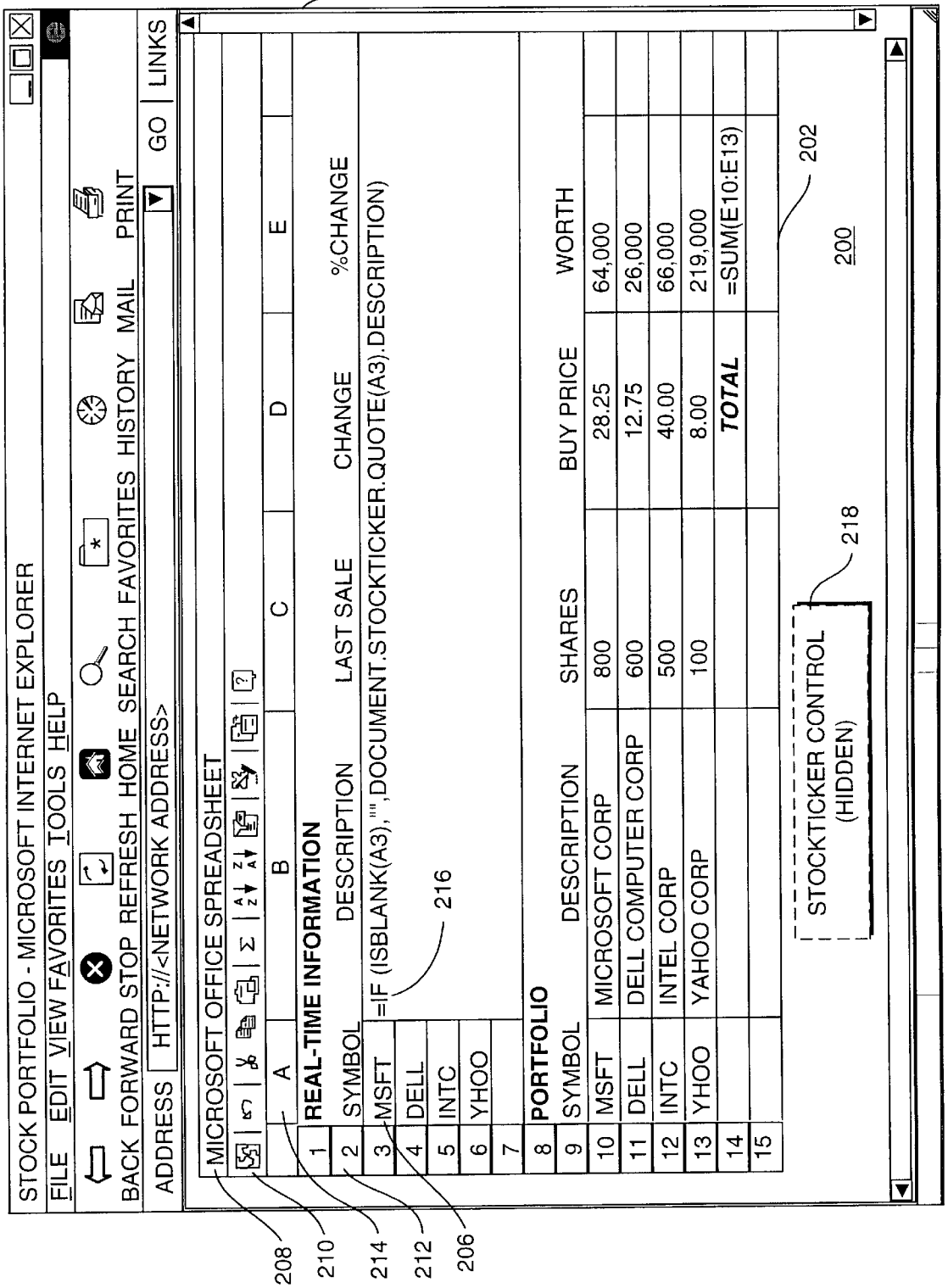
FIG. 4 is an illustration of a web page containing a spreadsheet control and providing an exemplary implementation of the present invention.

An exemplary use of the spreadsheet Web Component is discussed below with reference to FIG. 4, which shows a web page 200 that contains a spreadsheet COM control 202 for calculating stock portfolio information, as viewed in an INTERNET EXPLORER™ browser window 204. The spreadsheet COM control comprises a plurality of cells 206, which are similar to the cells found in conventional spreadsheets. The spreadsheet COM control can comprise a single cell, or an entire spreadsheet. The spreadsheet COM control may optionally comprise a title bar 208, a UI toolbar 210, and respective row and column headers 212 and 214.

A user can generate a spreadsheet COM control by creating an EXCEL™ spreadsheet (OFFICE 2000™ version or later), selecting a range of cells or a specific spreadsheet to be included in the control, and selecting the "Save As Web Page" command from EXCEL's™ file menu. The user can then selectively add interactivity by choosing the "Selection: <range>" radio button and checking the "Add interactivity" checkbox. The <range> will include the selected range of cells. If the user has not selected a range of cells, the current sheet is presumed to have been selected, and the previous "Selection: <range>" text next to the radio button is changed to "Selection: Sheet." The user can also control various publication parameters by activating a "Publish" pushbutton, which launches a "Publish as Web Page" dialog for entry of various information concerning publication of the selected spreadsheet cells (or spreadsheet), including interactive functionality relating to whether the control is to behave as a spreadsheet or as a pivot table.

When the selected cells or sheet are published interactively, a "<filename>.htm page is created, which contains object tags that refer to the OFFICE 2000™ spreadsheet COM control. When a user browses the page with INTERNET EXPLORER™ 4 or 5, the controls are instantiated in place, providing interactive regions inside the page.

The user can also use Microsoft FRONTPAGE™ to create a web page with a COM spreadsheet control. The user simply opens a new or existing document and selects the "Insert->Component->Office Spreadsheet" menu item, and a COM spreadsheet control is inserted onto the web page document. A user can change the way the titlebar, UI toolbar, row and column headers, and other information are displayed by selecting the COM spreadsheet control, right-clicking on it, and selecting the "Property toolbox" option (or activating the "Property toolbox" option from the FRONTPAGE™ main dropdown menu). The "Property toolbox" option can also be used for COM spreadsheet controls that were created by EXCEL™ following the method discussed above. Activation of the "Property toolbox" option causes a spreadsheet property toolbox to be displayed, which enables the user to select various options for displaying the spreadsheet control.

The COM spreadsheet control has the ability to "bind" to properties and methods of any object on the page, including both DOM objects, like intrinsic HTML controls, as well as any other COM object, scriptlet, or Java applet on the page. When the spreadsheet control binds to a property, it also registers itself as a change notification sink. If the bound object provides a property change notification mechanism through its interface, the spreadsheet can be automatically advised of changes to an object's property by its change notification sink registration. COM objects provide a property change notification through an IpropertyNotifySink interface. The IpropertyNotifySink interface includes an OnChanged member method that is used to notify requesting objects whenever a property of a bound object is changed. Whenever the bound object notifies its listeners that a property value has changed, the spreadsheet obtains the new value and recalculates any other cells that are dependent on the bound cell.

A formula 216 in cell B3 illustrates how a cell can be bound to an object using a spreadsheet COM control. The formula in cell B3 reads:

=IF (ISBLANK(A3),"",
    document.stockticker.quote(A3).Description).

This formula contains a reference to a hidden control object 218 on the page called "Stockticker," and it binds the cell to an object property that is returned by the Stockticker control's GetQuote method. Note that the user can employ the contents of other cells in the spreadsheet as inputs or parameters to methods on a bound object (e.g., in this page, the contents of the cells in column A, are usdd as a parameter to the GetQuote method).

The general format for property binding formulas is as follows:

=document.<object reference>.<property or method>

The "=document." is a keyword indicating to the spreadsheet control that this equation is a property or method binding formula. The "<object reference>" part can be any string that would return a reference to a COM object currently contained in the DOM and can be as simple as the name of another control or element on the page, or it can be a long nesting of methods that would return an object reference. The last part, "<property or method>", is the name of the property or method to which the user wants the cell to be bound. For example, if the object supports a "last sale" property, the user could bind this property to the cells by entering the formula:

=IF(ISBLANK(A3),"",document.stockticker.quote(A3).LastSale).

Property information may typically comprise text strings, booleans, and numerical values. Optionally, any VISUAL BASIC™ variant can be bound to the cell. If no property or value is entered, the spreadsheet control will attempt to bind to the default property of the object if one is defined (i.e., the property with a dispID of zero).

The Stockticker control is a type of OLE automation object. An OLE automation object provides a method or methods for automatically forwarding information from itself to various clients that request the information. If the OLE automation object supports the IPropertyNotifySink interface, the object can automatically notify clients when its data have changed.

The Stockticker control is written in VISUAL BASIC™, and it uses the Win Inet control to get the page returned for the MSN™ investor web site to obtain quote data for the stock symbols present in column A when requested. The Stockticker control uses a timer to refresh the quote data. The refresh interval is a property on the control, expressed in milliseconds, which the user can vary. Upon each refresh, if any of the properties have changed the Stockticker control forwards a property changed notification to the spreadsheet control via its IpropertyNotifySink::OnChanged method. Upon receiving this notification, the spreadsheet control retrieves the property information that has changed, and recalculates its cells as appropriate (see below).

Using the IDispatch Interface

In some instances, it is preferable to not use the COM interfaces that provide direct access to an object's properties or methods (i.e., the object's v-table). Such instances occur when using an automation controller such as VISUAL BASIC™, which provides the flexibility of not needing to know anything about the objects that it is to access, until run-time. Access to objects at run-time can be performed through the use of the "Dispatch" interface. The IDispatch interface is COM's automation interface for controllers that do not use link-time COM interfaces. Accessing an object through IDispatch is called "late-bound" or "name-bound" access, since the connection between the client and the COM object (on the server application) occurs at run time instead of at link time (late bound), and uses string names of properties and methods to resolve references (name-bound). COM automation controllers like VISUAL BASIC™ hide the inner workings of COM, and call all of the necessary methods in IDispatch on behalf of the programmer.

At run-time, clients pass the string name of the property or method they wish to call into the IDispatch::GetIDsOfNames( ) method. If the property or method exists on the object, the client is returned the dispatch ID (dispID) of the corresponding function. The dispID can then be used to invoke the function using IDispatch::Invoke( ). When using IDispatch, the properties and methods on the interfaces exposed by a single object appear as a flat list. Since name-bound access requires two function calls, it is less efficient than using the direct COM interface for accessing an object.

The following steps may be used to access an exposed OLE automation object using IDispatch:

1. Initialize OLE using the OleInitialize function.
2. Create an instance of the object to be accessed using the CoCreateInstance function.

If the object's application is not yet running, OLE starts it and initializes the object. Note that if OLE starts the application, it may not be visible. With Microsoft EXCEL™, the Visible property for the application must be set to make it visible.

3. Obtain a reference to the object's IDispatch interface using the QueryInterface member function.

With Microsoft EXCEL™, steps 2 and 3 can be combined, and the IDispatch reference obtained directly from the CoCreateInstance function.

4. Use the GetIDsOfNames member function to obtain the dispID values for the desired method or property exposed in the object's IDispatch interface.

5. Use the Invoke member function to access the method or property.

6. Terminate the object by invoking the appropriate method in its IDispatch interface.

7. Uninitialize OLE, using the OleUninitialize function.

The IDispatch interface can be used to determine if a particular object supports the IpropertyNotifySink interface. Objects that support this interface can issue a property changed notification to a requesting client whenever a requested property is changed. For instance, in the foregoing Stock Portfolio example, the Stockticker control issues a property changed notification to the spreadsheet control whenever the price of a registered property (i.e., the price of a selected stock or stocks) changes.

Figure 3:
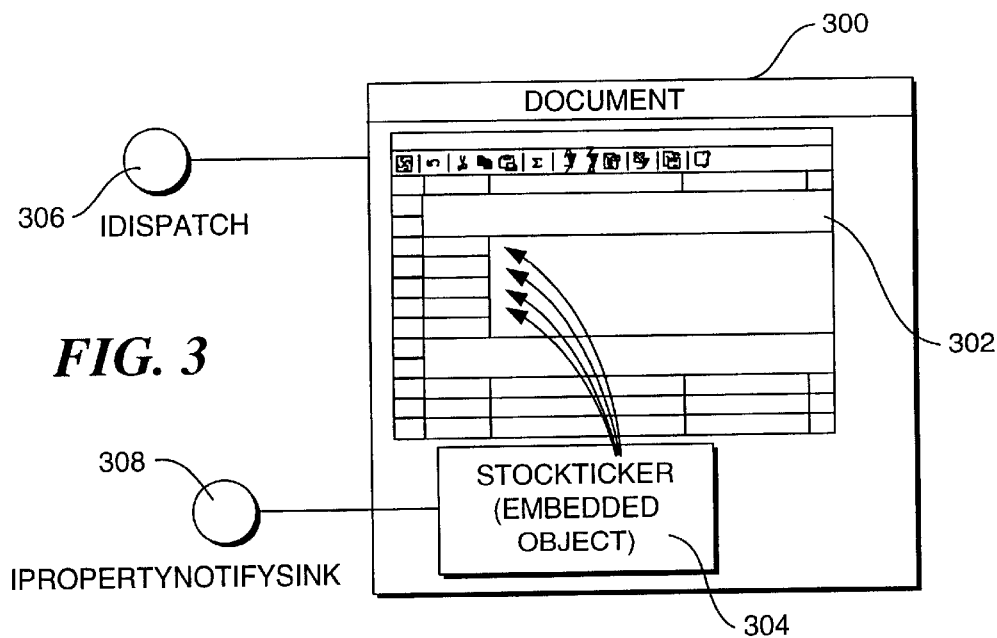
FIG. 3 is a block diagram schematically illustrating a web page document and its COM interface, a spreadsheet control, an embedded object, and the embedded object's COM interface.

FIG. 3 illustrates the relationship between various objects and interfaces of the Stock Portfolio example discussed above. A web page document 300 includes a spreadsheet control 302 and a hidden Stockticker control 304. The Stockticker control is an object that is embedded in the document and comprises a plurality of properties and methods. The spreadsheet control contains one or more cells that reference a property or method of the Stockticker control.

The document exposes an IDispatch interface 306, which enables a COM client to obtain data from the document or access any of the document's embedded objects. The Stockticker control exposes an IPropertyNotifySink interface 308, which allows it to automatically notify the spreadsheet control when a change occurs to a property that is referenced by one of the spreadsheet control's cells, such as the current price of a stock. This feature is accomplished through the IPropertyNotifySink interface's OnChanged member method.

Information in the spreadsheet control can also be updated if the bound object does not provide an IPropertyNotifySink interface. This requires a bit more work, since the bound object cannot provide a property changed notification to the spreadsheet control. In this instance, the spreadsheet control must query the bound object using either IDispatch or QueryInterface, which allows a user to determine what properties or methods are exposed by the object. Using Dispatch returns a dispID for the bound method or property, which can be used with the IDispatch::Invoke method to access the method or property. The spreadsheet will then recalculate to reflect any changes in the bound property. This process can be performed on a periodic basis to continually update the spreadsheet.

Parsing and Binding

The spreadsheet control requires means for communicating with the objects that are bound to its cells. This communication involves a two-step parsing and binding process. During a first parsing step, each cell's formula expression is broken down into its components, and a determination is made as to whether the cell requires binding to an external object, by searching for an "=document." component. A binding process is then performed on cells that require binding. In a first step of the binding process, the document's (i.e., the web page's) IDispatch interface is queried to obtain an identifier to the <object reference> defined in each cell's formula, using the IDispatch::GetIDsofNames( ) method. This query returns a dispID identifier for each object reference and its methods and/or properties. The dispID's are then parsed to match the dispID information with the bound cells. Additional queries may need to be made if the object reference itself contains one or more levels of nested objects and/or methods.

Spreadsheet Recalculation

As discussed above, whenever a bound cell's value changes, the spreadsheet is recalculated, as appropriate. However, not all cells are recalculated based on a change in a cell or cells, but instead, only those cells that contain a formula that references the changed cell or cells are recalculated by the spreadsheet COM control's recalculation engine.

Figure 5:
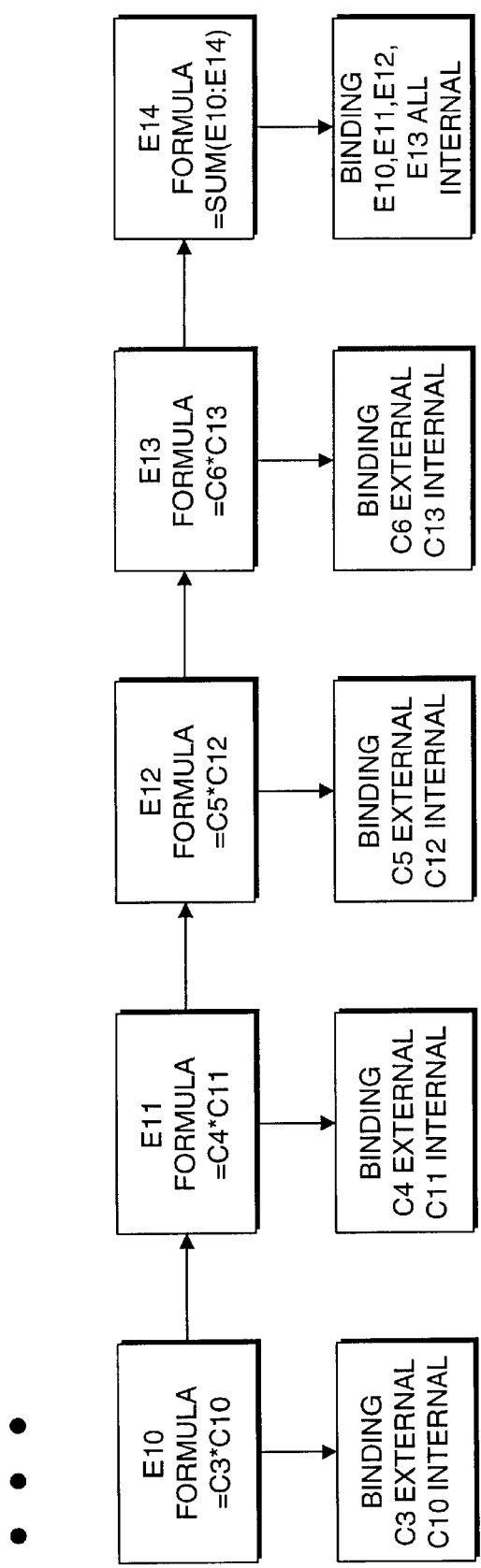
FIG. 5 is a block diagram representing a portion of a spreadsheet recalculation chain corresponding to the recalculation of a total worth cell in the spreadsheet control of FIG. 4.

FIG. 5 illustrates a portion of a recalculation chain that is executed by the spreadsheet control's recalculation engine whenever the value in one of the bound cells in the Stock Portfolio spreadsheet changes. The portion shown in FIG. 5 corresponds to the recalculation of cell E14. The formula in cell E14 represents the stock portfolio's total worth, which equals the sum of the values in cells E10, E11, E12, and E13. Thus, this portion of the chain is recalculated whenever the value in any of cells E10, E11, E12, or E13 changes. Each of these cells contains a formula that is bound to other cells and/or external objects. For example, cell E10 contains the total value of Microsoft Corporation stock held in the portfolio, which is calculated by a formula that is bound to cells C3 and C10. The value in C10 is the number of shares (800), and the value of C3 is calculated by invoking the GetQuote method to return the last price of Microsoft Corporation stock from the Stockticker control. Thus, whenever a property change notice is issued to the spreadsheet, the cell bound to the object whose property has changed is first recalculated using the changed property, and then any cells that contain a formula bound to that cell is recalculated in a logical sequence. Following this construct, the formula for cell E10 is recalculated, and then the formula for cell E11 is recalculated, and so on, until the recalculation chain is completed. The recalculation engine ensures that only the cells containing formulas that reference a cell receiving a property change notification are recalculated upon such notification.

Exemplary Operating Environment

Figure 6:
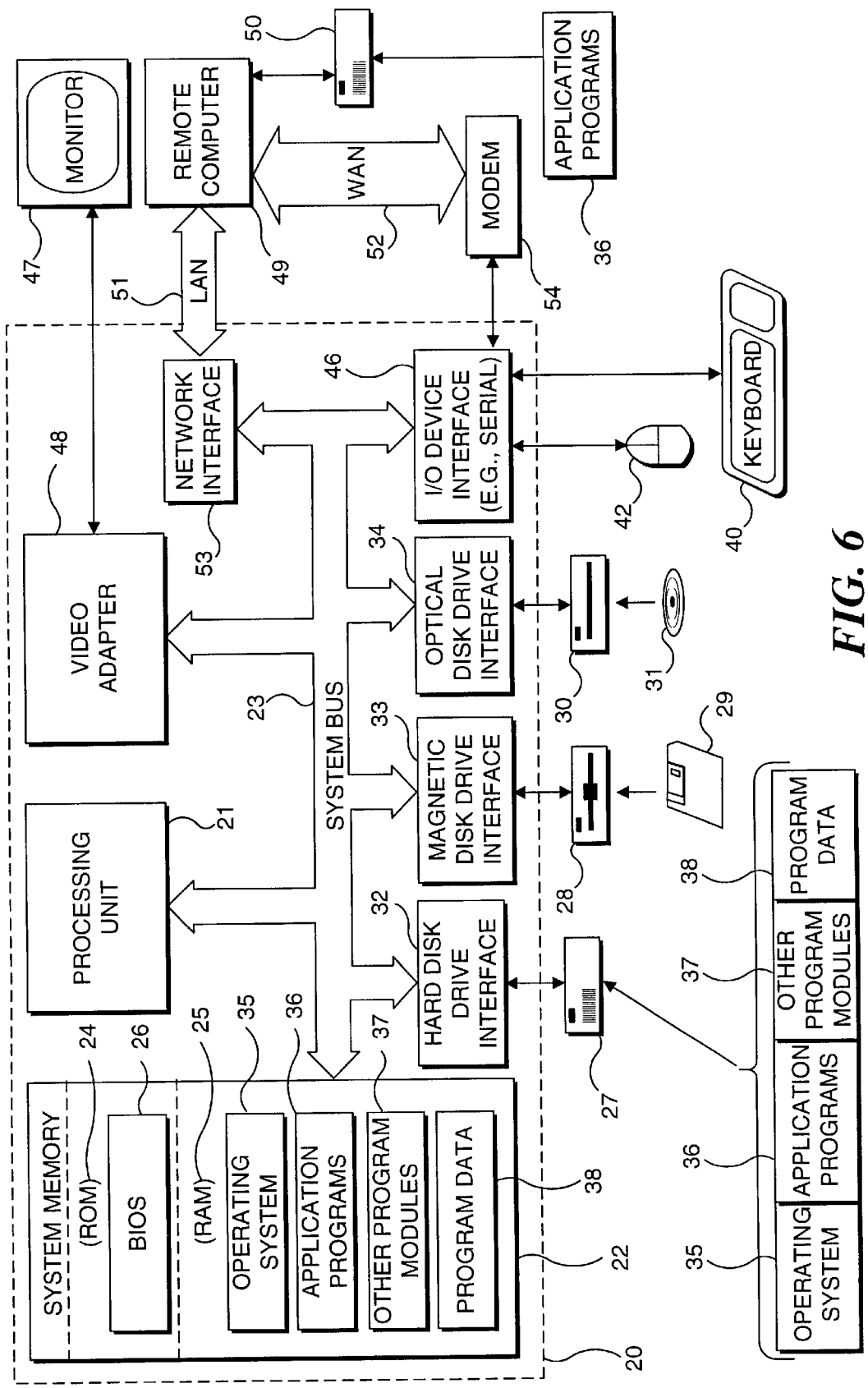
FIG. 6 is a functional block diagram illustrating an exemplary computer system suitable for practicing the present invention.

FIG. 6 and the following discussion are intended to provide a brief, general description of a suitable computing environment in which the invention may be implemented. The foregoing application programs (the EXCEL™ spreadsheet program and the FRONTPAGE™ web publishing program in Microsoft OFFICE 2000™, and Microsoft's INTERNET EXPLORER™) comprise a plurality of program modules that include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 6, an exemplary system for implementing the invention includes a general purpose computing device in the form of a conventional personal computer 20, including a processing unit 21, a system memory 22, and a system bus 23 that couples various system components including the system memory to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that helps to transfer information between elements within personal computer 20, such as during start-up, is stored in ROM 24. Personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk interface 34, respectively. The drives and their associated computer readable media provide nonvolatile storage of computer readable instructions, data structures, program modules, and other data for personal computer 20. Although the exemplary environment described herein employs hard disk 27, removable magnetic disk 29, and removable optical disk 31, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment.

A number of program modules may be stored on hard disk 27, magnetic disk 29, optical disk 31, ROM 24, or RAM 25, including an operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to processing unit 21 through a serial port interface 46 that is coupled to the system bus, but may be connected by other interfaces, such as a parallel port, game port, or a universal serial bus (USB). A monitor 47 or other type of display device is also connected to system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers, such as a remote computer 49. Remote computer 49 may be another personal computer, a server, a router, a network PC, a peer device, or other common network node, and typically includes many or all of the elements described above relative to personal computer 20, although only a memory storage device 50 has been illustrated in FIG. 6. The logical connections depicted in FIG. 6 include a local area network (LAN) 51 and a wide area network (WAN) 52. Such networking environments are commonplace in offices, enterprise wide computer networks, intranets, and the Internet.

When used in a LAN networking environment, personal computer 20 is connected to local network 51 through a network interface or adapter 53. When used in a WAN networking environment, personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device. It will be appreciated that the network connections shown are exemplary and other means of establishing a communications link between the computers may be used.

While the invention has been described in terms of the COM object model, it also may be practiced using other object models that provide similar interfacing schemes, such as JAVA BEANS™ from the Sun Corporation. In addition, other types of controls such as ACTIVEX™ controls may be implemented in addition to the VISUAL BASIC™ type of control used in the Stock Portfolio example.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of binding a cell in a spreadsheet to an external object that is not included on the spreadsheet, comprising the steps of:

(a) referencing the external object and a property of the external object in a formula within the cell of the spreadsheet;

(b) parsing the formula to extract a reference to the external object and its property;

(c) establishing a property change notice link between the spreadsheet and the external object based on the reference to the external object and its property;

(d) forwarding a property change notice to the spreadsheet when the external object's property changes;

(e) extracting the changed property from the external object and forwarding it to the spreadsheet; and (f) recalculating the formula in the cell using the changed property of the external object.

2. The method of claim 1, wherein the external object is associated with a function that automatically forwards the property change notice to the spreadsheet when the external object's property changes.

3. The method of claim 1, further comprising the step of using a value calculated from the formula in the cell to recalculate the spreadsheet.

4. The method of claim 1, wherein the property change notice is established by registering the spreadsheet as a change notification sink.

5. The method of claim 1, wherein the external object is contained within a document, and the reference to the object identifies the document.

6. The method of claim 5, wherein the spreadsheet comprises a spreadsheet control that is embedded in the document.

7. The method of claim 5, wherein the document comprises a web page.

8. The method of claim 5, wherein the external object comprises an automatic control that communicates data across a computer network.

9. A computer-readable medium having computer-executable instructions for performing the steps recited in claim 1.

10. A method for binding a cell in a spreadsheet to an external object that is not included on the spreadsheet, comprising the steps of:

(a) creating a formula in the cell, said formula referencing an identity of the external object and a method or property exposed by the external object, wherein the external object comprises functional compiled code;

(b) parsing the formula to extract the identity of the external object and the method or property exposed by the external object; and (c) binding the external object to the cell by establishing a link from the cell to the external object, so that the method exposed by the external object is executed or the property exposed by the external object is retrieved when a recalculation is performed on the cell.

11. The method of claim 10, wherein the external object is contained in or allowed access to a top-level document, and the formula includes an identification of the top-level document.

12. The method of claim 11, wherein the top-level document references an identifier for the external object and the method or property exposed by the external object.

13. The method of claim 11, wherein the step of binding the external object to the cell comprises the steps of:

(a) obtaining an identifier for the method or property exposed by the external object, by accessing an interface for the top-level document; and (b) invoking interface for the top-level document with the identifier to access the method or property exposed by the external object in response to a request to recalculate the cell.

14. The method of claim 11, wherein the top-level document comprises a web page.

15. The method of claim 14, wherein the spreadsheet comprises a spreadsheet control that is embedded in the web page.

16. The method of claim 15, wherein the spreadsheet control is viewed with a browser that displays a value for the cell after the recalculation.

17. The method of claim 11, wherein the external object comprises an automatic control that is contained in the top-level document, the automatic control being able to automatically retrieve data from external data sources.

18. A computer-readable medium having computer-executable instructions for performing the steps recited in claim 10.

19. A system for binding a cell in a spreadsheet to an external object that is not included on the spreadsheet, comprising:
 (a) a memory in which are stored a plurality of machine instructions; and
 (b) a processor, coupled to the memory, for implementing a plurality of functions when executing the machine instructions stored in the memory, said plurality of functions including:
  (i) enabling a user to reference the external object and a property of the external object in a formula within the cell of the spreadsheet;
  (ii) parsing the formula to extract a reference to the external object and its property;
  (iii) establishing a property change notice link between the spreadsheet and the external object based on the reference to the external object and its property;
  (iv) forwarding a property change notice to the spreadsheet when the external object's property changes;
  (v) extracting the changed property from the external object and forwarding it to the spreadsheet; and
  (vi) recalculating the formula in the cell using the changed property of the external object.

20. The system of claim 19, wherein the external object is associated with a function that automatically forwards the property change notice to the spreadsheet when the external object's property changes.

21. The system of claim 19, wherein execution of the machine instructions further implements the function of using a value calculated from the formula in the cell to recalculate the spreadsheet.

22. The system of claim 19, wherein the property change notice is established by registering the spreadsheet as a change notification sink.

23. The system of claim 19, wherein a plurality of data and machine instructions comprising a document are stored in the memory, the external object is contained within the document, and the reference to the external object identifies the document.

24. The system of claim 23, wherein the spreadsheet comprises a spreadsheet control comprising data and machine instructions that are embedded in the document, execution of the machine instructions comprising the spreadsheet control enabling said control to provide a spreadsheet functionality within the document.

25. The system of claim 23, wherein the document comprises a web page, and the machine instructions further comprise a browser application program for viewing the web page.

26. The system of claim 23, wherein the processor is connected to a computer network, and the external object includes an automatic control comprising machine instructions stored in the memory that cause the processor to communicate data across the computer network.

27. A method of binding a cell in a spreadsheet to an external object that is not within the spreadsheet, said external object being associated with one or more properties, comprising the steps of:
 (a) providing the external object that is not within the spreadsheet, the external object comprising compiled code, internal data, and being associated with a property that provides a service to the spreadsheet;
 (b) referencing the external object and the property of the external object in a formula within the cell of the spreadsheet;
 (c) parsing the formula to extract a reference to the external object and its property;
 (d) establishing a property change notice link between the spreadsheet and the external object based on the reference to the external object and its property;
 (e) forwarding a property change notice to the spreadsheet when the external object's property changes, resulting in a changed property;
 (f) obtaining the changed property from the external object and forwarding the changed property to the spreadsheet; and
 (g) recalculating the formula in the cell using the changed property of the external object.

28. The method of claim 27, wherein the step of referencing the external object and the property of the external object in the formula within the cell of the spreadsheet comprises the step of referencing a default property of the external object.

29. The method of claim 27, wherein the step of referencing the external object and the property of the external object in the formula within the cell of the spreadsheet comprises the step of referencing a specific property included in a table of properties, by name.

30. The method of claim 27, wherein:
 (a) the step of referencing the external object and a property of the external object in a formula within the cell of the spreadsheet comprises the step of referencing the property of the external object by referencing a type of the property, and
 (b) the step of establishing the property change notice link between the spreadsheet and the external object comprises the steps of:
  (i) querying the external object to determine each property of the external object;
  (ii) comparing each property of the external object with the type of property referenced in the formula; and
  (iii) establishing a property change notice link between the spreadsheet and the property of the external object that most closely corresponds to the type of property referenced in the formula.

\* \* \* \* \*